United States Patent [19]
Cooper et al.

[11] Patent Number: 4,891,540
[45] Date of Patent: Jan. 2, 1990

[54] GENERATOR CORE SUPPORT SYSTEM

[75] Inventors: Glenn D. Cooper, Orlando; Felix M. Detinko, Winter Park, both of Fla.; Gurdev Singh, Monroeville; Andre J. Levino, Jeannette, both of Pa.

[73] Assignee: Westinghouse Electric Corp., Pittsburgh, Pa.

[21] Appl. No.: 265,741

[22] Filed: Nov. 1, 1988

[51] Int. Cl.$^4$ .......................... H02K 1/18; H02K 5/24
[52] U.S. Cl. ...................................... 310/254; 310/51; 310/91; 310/217
[58] Field of Search ...................... 310/42, 51, 89, 91, 310/216, 217, 254, 258

[56]  References Cited

U.S. PATENT DOCUMENTS

| | | | |
|---|---|---|---|
| 2,199,351 | 4/1940 | Taylor | 310/258 |
| 4,051,399 | 9/1977 | Stanwick et al. | 310/258 |
| 4,425,523 | 1/1984 | Detinko et al. | 310/258 |
| 4,564,779 | 1/1986 | Terry, Jr. | 310/258 |
| 4,634,909 | 1/1987 | Brem | 310/91 |

Primary Examiner—Patrick R. Salce
Assistant Examiner—Emanuel Todd Voeltz
Attorney, Agent, or Firm—M. G. Panian

[57]  ABSTRACT

A spring support system for supporting a stator core (2) in a frame of an electrical machine, the core (2) having a longitudinal axis and an outer periphery provided with a plurality of circumferentially spaced, axially extending dovetail grooves (6), and the frame including a plurality of circular flanges (32) which surround the core (2) when the core (2) is installed in the frame, the system including:

a plurality of key bars (8) each having a portion formed to mate with a respective dovetail groove (6) and each seated in a respective groove (6) of the core (2);

a plurality of spring bars (34) each extending parallel to a respective key bar (8) and each secured to the flanges (32);

a plurality of key blocks (20) for securing the key bars (8) to the spring bars (34); and fastening elements (26,40) mechanically fastening each key block (20) to a respective key bar (8) and to a respective spring bar (34) at a location between two axially adjacent flanges (32).

8 Claims, 2 Drawing Sheets

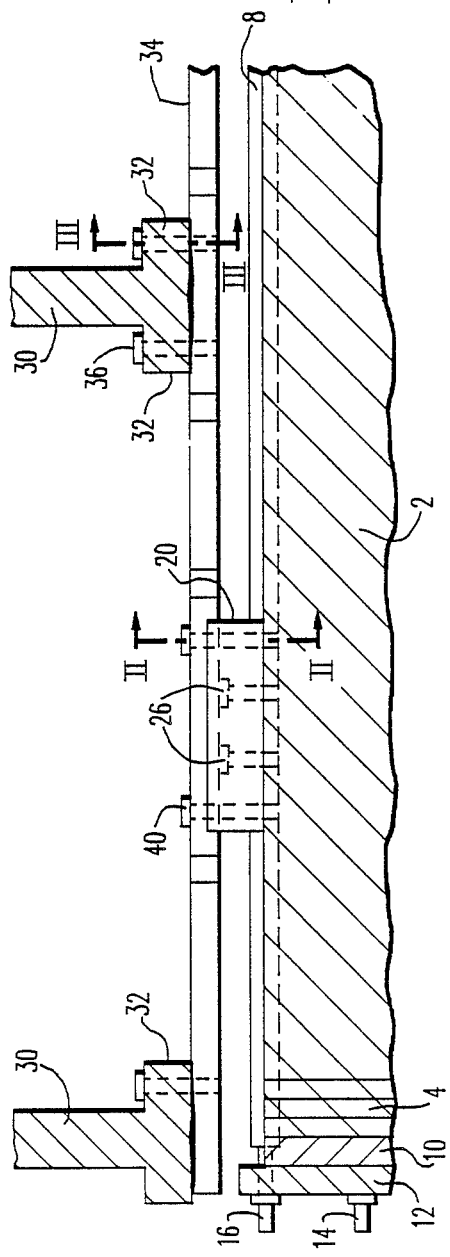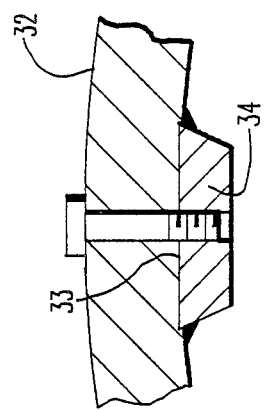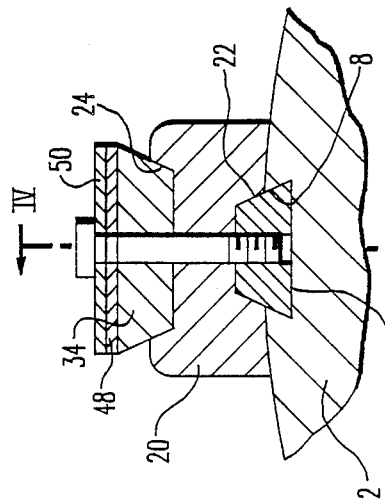

GENERATOR CORE SUPPORT SYSTEM

BACKGROUND OF THE INVENTION

The present invention relates to the manufacture of electrical generators, and particularly to the assembly of the stator core and stator support frame of such a generator.

The stationary portion of a large generator is generally composed of an exterior frame and a core located radially inwardly of the frame and secured thereto by a connecting structure having spring characteristics selected to isolate core vibrations from the frame and the foundation on which the frame rests.

Various types of connecting structures have already been proposed, such as disclosed, for example, in U.S. Pat. Nos. 2,199,351; 2,320,843 and 2,811,659. These connecting structures are of such a nature that the frame must first be completed, after which core assembly takes place within the frame.

It is recognized that significant economies can be achieved if the stator frame and core can be manufactured in parallel operations and assembled at a later time. A support structure intended to achieve this result is disclosed in U.S. Pat. No. 4,425,523.

SUMMARY OF THE INVENTION

It is a primary object of the present invention to provide a connecting structure and assembly method which enable the core and frame to be manufactured in parallel and which offer advantages over the approach disclosed in the earlier patent.

A more specific object of the invention is to provide an improved connection between the core and the connecting structure.

A further object of the invention is to allow the frame to be dimensioned to permit insertion of the separately assembled core together with its associated end plates.

The above and other objects are achieved, according to the invention, by a spring support system for supporting a stator core in a frame of an electrical machine, the core having a longitudinal axis and an outer periphery provided with a plurality of circumferentially spaced, axially extending dovetail grooves, and the frame including a plurality of circular flanges which surround the core when the core is installed in the frame, the system comprising:

a plurality of key bars each having a portion formed to mate with a respective dovetail groove and each seated in a respective groove of the core;

a plurality of spring bars each extending parallel to a respective key bar and each secured to the flanges;

a plurality of key blocks for securing the key bars to the spring bars; and fastening means mechanically fastening each key block to a respective key bar and to a respective spring bar at a location between two axially adjacent flanges.

The objects of the invention are further achieved by a stacking fixture for assembling a stator core of an electrical machine, which core is composed of a plurality of laminations, with each lamination being composed of a plurality of elements having the form of circular segments, the circular segments being provided, at the surface which forms the periphery of the assembled core, with axially extending grooves, the fixture comprising:

means forming a cylindrical support structure enclosing a region for receiving the core laminations;

a plurality of stacking keys each extending parallel to the axial dimension of the support structure and each located to engage a respective groove; and bracket means supporting each stacking key from the support structure;

wherein the stacking keys are configured to engage respective grooves by radial movement of the lamination elements relative to the stacking keys.

BRIEF DESCRIPTION OF THE DRAWINGS

FIG. 1 is a longitudinal, cross-sectional, detail view of a portion of a stator core and frame connected together by a connecting structure according to the present invention.

FIG. 2 is a cross-sectional detail view taken along the line II—II of FIG. 1.

FIG. 3 is a cross-sectional detail view taken along the line III—II of FIG. 1.

DESCRIPTION OF THE PREFERRED EMBODIMENTS

Figure 4:
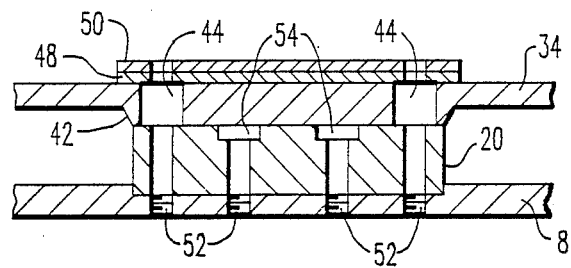
FIG. 4 is a cross-sectional detail view along the line IV—IV of FIG. 2 of a portion of a connecting structure according to the invention.

The assembly shown in FIG. 1 includes a stator core 2 which has a conventional structure composed of a plurality of steel laminations 4 arranged in a stack which extends along the core axis. Each lamination is typically composed of a plurality of circular segments and the core is assembled so that the segments of one lamination are angularly offset from those of the adjacent lamination so that each segment of one lamination overlaps two segments of each adjacent lamination.

The outer periphery of core 2 is provided with a plurality of dovetail grooves 6, one of which is designated in FIG. 2, each groove extending parallel to the core axis and containing a key bar 8 having a trapezoidal shape which mates with the associated dovetail groove 6. Normally, each lamination segment will be provided with at least two grooves 6 and two grooves of one segment will each be aligned with a respective groove in each of two adjacent segments of the adjacent lamination 4.

The portion of each key bar 8 which engages a groove 6 may be given cross-sectional dimensions slightly smaller than the corresponding dimensions of groove 6 to facilitate insertion of key bars 8 in grooves 6.

At each axial end of core 2 there are disposed an interior pressure plate, or finger plate, 10 and an exterior pressure plate, or end plate, 12. All plates 10 and 12 and all laminations 4 can be provided with bolt passages for receiving a plurality of bolts 14 that extend throughout the axial length of core 2 and project from plates 12. Each end of each bolt 14 is provided with a nut which is tightened to apply the desired compression force to core 2. Compression bolts 16 may be inserted into threaded passages in each end of each key bar 8, and a compression force may be produced by tightening a nut associated with each bolt 16. In this case, the resulting compression force applied to core 2 is absorbed in the form of a tension force imposed on each key bar 8. Due to the presence of bolts 16, through bolts 14 may be eliminated if end plates 12 are appropriately constructed in a manner known in the art.

Key bars 8 thus act to hold he components of core 2 in alignment, to secure core 2 to the surrounding frame, as will be described in greater detail below, and to act as axial tension members via which compressive loading is applied to core 2.

After core 2 has been assembled with key bars 8, plates 10 and 12 and at least bolts 16, a plurality of key blocks 20 are secured to each key bar 8. Each key block 20 is provided with a bottom groove 22 which receives the associated key bar 8, and with a top groove 24, which preferably has chamfered sides. Each key block 20 is secured to an associated key bar 8 by means of bolts 26 whose heads are countersunk in recesses formed in the base of groove 24 so that the top of each bolt 26 extends no higher than the groove base. Tightening of bolts 26 clamps key bars 8 against the sloping sides of grooves 6 and clamps key blocks 20 against the outer periphery of core 2.

Because of the mating trapezoidal, or dovetail, shapes of grooves 6 and key bars 8, the mechanical fastening of key blocks 20 to key bars 8 and the clamping of key blocks 20 against core 2, key bars 8 can effectively absorb torque loads exerted on core 2 during machine operation and are positively held against rotation in grooves 6 under the influence of such torque loads.

The assembled core is then installed in a frame composed of a cylindrical casing (not shown) provided with radially inwardly extending, annular plate members 30. Each plate member 30 is provided at its inner periphery with one or two annular, axially projecting flanges 32 and each flange is provided with an array of bolt holes extending around the flange periphery.

A plurality of axially extending, circumferentially spaced spring bars 34 are secured to flanges 32 by means of threaded bolts 36 which pass through the bolt holes in flanges 32 and engage in threaded passages in spring bars 34. Each flange 32 is provided, at its inner surface, with machined flats 33 each contacting a respective spring bar 34 to assure accurate positioning of each spring bar 34 relative to flanges 32. Subsequent to bolting, each spring bar is preferably also welded to flanges 32. The circumferential spacing between spring bars 34 corresponds to the circumferential spacing between key bars 8.

The assembled core is installed in the frame by sliding grooves 24 in key blocks 20 along spring bars 34 until bolt holes in spring bars 34 come into alignment with bolt holes in key blocks 20, the latter bolts holes also being aligned with threaded passages in key bars 8. Then, bolts 40 are installed to secure spring bars 34 to key blocks 20 and key bars 8, and assembly is completed.

Each key block 20 is positioned to be located midway between two successive plate members 30 so that, typically, there is one key block 20 located between each successive pair of plate members 30 and core 2 can experience a certain degree of tangential movement relative to the frame.

Spring bars 34 are constructed, according to principles known in the art, to have sufficiently low spring constants in both the radial and tangential directions, to effectively isolate the frame from core vibrations. Spring bars 34 are additionally constructed to be capable of withstanding short-circuit torques, which are typically 8 to 10 times the normal rated torque of the generator at frequencies of twice the line frequency and higher harmonics.

Because of the presence of key blocks 20, a radial gap exists between key bars 8 and spring bars 34. This gap provides sufficient space for movement of plates 10 and 12 through the cylindrical region enclosed by spring bars 34 during core installation. Moreover, because of the connecting function performed by key blocks 20, spring bars 34 require less machining than in the previously proposed arrangement.

Referring to FIG. 4, it will be seen that each key bar 8 is preferably provided at its outer surface with a recess for each associated key block 20. This recess serves to accurately position the associated key block 20. In addition, these recesses provide a radial engagement between each key block 20 and key bar 8 which enables key blocks 20 to better support core 2 after connecting core 2 to the frame, which normally takes place while the axis of core 2 has a vertical orientation. Finally, the presence of each recess in the outer surface of each key bar 8 allows the portion of each key block 20 which extends between grooves 22 and 24 to be given a sufficient structural thickness without requiring an increase in the frame flange diameter.

As further shown in FIG. 4, the radial inner surface of each spring bar 34 is provided with a plateau, or land, 42 at the location of each key block 20 so that each spring bar 34 projects radially inwardly at each location where it is to be fastened to a key block 20 to a greater extent than at each location where spring bars 34 are secured to flanges 32. Therefore, during insertion of core member 2 into the machine frame, a larger radial gap will exist between the outer surfaces of key blocks 20 and spring bars 34 at the locations of plate members 30. This facilitates insertion of core member 2 since each spring bar 34 is capable of being deflected radially outwardly at the location of each land 42 as each key block 20 moves therepast during core insertion.

Figure 5:
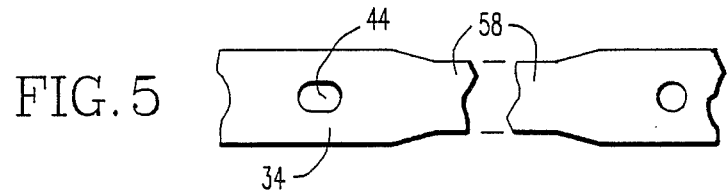
FIG. 5 is a detail plan view of an element of the structure of FIG. 4.

To allow for tolerance variations in the location of the bolt holes provided in spring bar 34 relative to the passages provided in key blocks 20 and key bars 8, each spring bar 34 is provided, at the location where it is to be secured to each key block 20 and key bar 8, with longitudinally elongated slots 44, which may also be seen in FIG. 5. For supporting the heads of bolts 40 (not shown in FIG. 4), each spring bar 34 is provided, at the location of each associated key bar 20, with a back-up plate 48 to support the compressive forces produced by bolts 40. On each back-up plate 48 there is placed a locking plate 50 which is sufficiently thin to allow corners of plate 50 to be bent upwardly, after bolts 40 have been installed and tightened, in a manner to prevent loosening of bolts 40.

FIG. 4 further shows key bar 8 provided with threaded passages 52 for threadedly engaging bolts 26 and 40, while key block 20 is provided with countersunk passages 54 to receive the heads of bolts 26.

Turning to FIG. 5 which is a plan view of a portion of spring bar 34, it will be seen that, in further accordance with the invention, spring bar 34 is provided with a narrowed region 58 between each location where spring bar 34 is secured to a respective key block 20 and each location where spring bar 34 is fastened to a respective flange 32. This width of each region 58 determines the spring constant of spring bars 34. This narrowed region further facilitates insertion of core 2 into the machine frame. Preferably, for the same reason, the region of each spring bar 34 which is fastened to a flange 32 is somewhat narrower than each region thereof which is fastened to a key block 20, in the circumferential direction of the machine. This provides an additional increase in the gap which will exist between each key block 20 and its associated spring bar 34 as the key block is being moved past the region of each flange 32.

During insertion of the completed core 2 into the machine frame, a certain clearance exists between the outer surfaces of key blocks 20 and the inner surfaces of spring bars 34. After core 2 has reached the desired final position, the installation and tightening of bolts 40 will cause spring bars 34 to be deflected radially inwardly by a small amount to produce the desired secure engagement of core 2 to the machine frame. Preferably, the clearance which exists during insertion of core 2 into the machine frame is selected so that the amount of radial deflection experienced by spring bars 34 during tightening of bolts 40 will correspond at least approximately to the radial expansion of core 2 as a result of heating during generator operation. Thus, when the resulting generator is in operation, spring bars 34 can return to essentially a neutral, or undeformed, position.

Core 2 can be provided with stator windings either before or after insertion into the machine frame.

A core assembly according to the present invention can be constructed in a separate stacking fixture provided with stacking keys that correspond in position to key bars 8. Preferably the stacking fixture is oriented so that the core is assembled with its longitudinal axis vertical. Assembly is performed by the following sequence of operations. First, an exterior plate 12 and an interior plate 10 are placed on supports at the bottom of the fixture and stacking keys are disposed at locations corresponding to the intended locations of core grooves 6. Then the core laminations 4 are installed on the stacking keys.

After all laminations have been installed, key bars 8 provided with bolts 16 can be installed by removing the stacking key from each groove 6 in turn and sliding a key bar 8 into that groove. Then an interior plate 10 and an exterior plate 12 are place atop the assembled laminations and nuts are affixed to bolts 16 and tightened. Finally, key blocks 20 are fastened to key bars 8 by means of bolts 26. The resulting assembly can then be removed from the stacking fixture, ready to be installed in an associated frame.

Figure 6:
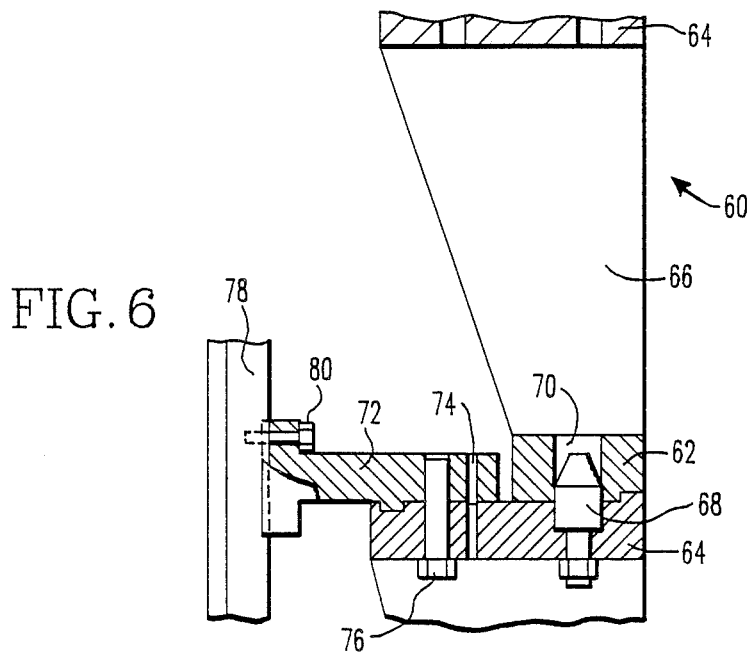
FIG. 6 is a cross-sectional, elevational detail view of a of a core stacking fixture according to the invention.
Figure 7:
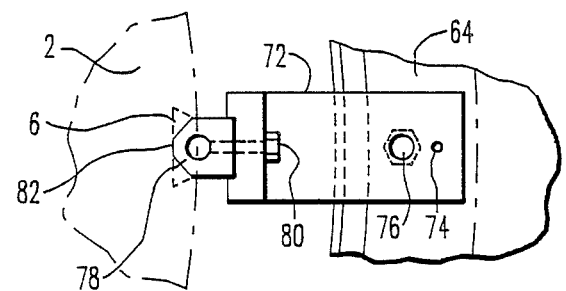
FIG. 7 is a detail plan view of a portion of the fixture shown FIG. 6.

The details of a suitable stacking fixture according to the invention, which will be in the form of an upright cylinder provided with components which will engage in core grooves 6, are illustrated in FIGS. 6 and 7.

FIG. 6 is a cross-sectional view taken in a vertical plane and showing one component of such a stacking fixture. This component is in the form of an annular member 60 and the stacking fixture is made up of a plurality of members 60 stacked upon one another. Each member 60 is composed of a lower ring 62 and an upper ring 64, rings 62 and 64 being secured together by a plurality of vertical webs, or plates, 66. The number of plates in each ring can be selected to provide the requisite load supporting capability.

For positioning members 60 relative to one another, each upper ring 64 is provided with a suitable pin 68 which engages in a mating opening 70 in ring 62 of the overlying member 60. A pin 68 and opening 70 are provided for circumferential alignment of members 60.

Each ring 64 carries a plurality of brackets 72, the number of brackets 72 on each ring 64 being equal to the number of grooves 6 in the outer circumference of core 2. Each bracket 72 is accurately positioned relative to its associated ring 64 by means of a positioning pin 74 and a bolt 76.

For engaging each groove 6 in the outer circumference of core 2 each vertically aligned group of brackets 72 supports a stacking key 78 by means of suitable bolts 80. Each stacking key 78 has a longitudinal extent corresponding to the axial dimension of core 2.

As shown in FIG. 7, the side of each key 78 which will engage in a groove 6 tapers to an inner end which is narrower than the opening defined by the associated groove 6 at the periphery of core 2. Between bracket 72 and the tapered portion, key 78 has a constant width which corresponds to the width of the open end of groove 6. This constant width portion of key 78 is dimensioned to extend at least a short distance into the associated groove 6 to facilitate positioning of the segments of each core lamination 4.

Because of the configuration of each key 78, installation of the core laminations is facilitated. Specifically, each lamination need not be slid along the entire length of each key 78 but rather can be placed in approximately the desired position and then moved radially outwardly to bring each key 78 into engagement in a respective groove 6. When the lamination segments are correctly positioned relative to stacking keys 78, the base of each groove 6 will engage the inner end 82 of each key 78.

After core 2 has been completely assembled, each key 78 can easily be withdrawn from its respective slot 6, by removing bolts 80 or 76, after which a key bar 8 can be slid in turn into its associated groove 6. After all key bars 8 have been inserted, plates 10 and 12 are placed atop the lamination stack, the nuts are tightened on bolts 16 and the completed core is ready to be lifted out of the stacking fixture and installed in the machine frame.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A spring support system for supporting a stator core in a frame of an electrical machine, the core having a longitudinal axis and an outer periphery provided with a plurality of circumferentially spaced, axially extending dovetail grooves, and the frame including a plurality of circular flanges which surround the core when the core is installed in the frame, said system comprising:
   a plurality of key bars each having a portion formed to mate with a respective dovetail groove and each seated in a respective groove of the core;
   a plurality of spring bars each extending parallel to a respective key bar and each secured to said flanges;

a plurality of key blocks for securing said key bars to said spring bars, each said key block having a first groove receiving a portion of its respective key bar, and each said key block further having a second groove receiving a portion of its respective spring bar; and fastening means mechanically fastening each said key block to a respective key bar and to a respective spring bar.

2. A system as defined in claim 1 wherein each said key bar is coextensive, in the direction of the longitudinal axis of the core, with a respective groove.

3. A system as defined in claim 2 wherein each said key bar has a portion which projects radially outwardly of the core and is received within the first groove of each said key block.

4. A system as defined in claim 3 wherein said fastening means comprise first bolt means mechanically fastening each said key block to a respective key bar and second bolt means mechanically fastening each said key block to spring bar.

5. A system as defined in claim 1 wherein each said spring bar is provided with an radially inward projecting portion via which a respective key block is fastened to said spring bar.

6. A system as defined in claim 1 wherein the machine further includes two circular end plates each mounted at a respective end of the core and said spring bars enclose a cylindrical space having a diameter greater than that of the end plates.

7. A system as defined in claim 6 further comprising bolt means clamping each end plate to the axial ends of said key bars.

8. The system as defined in claim 1, wherein each said key block is fastened to a respective key bar and to a respective spring bar at a location between two axially adjacent flanges.

* * * * *